Jan. 29, 1957 J. G. LEE 2,779,193
FLUID FLOW MEASURING DEVICE
Filed April 5, 1954 2 Sheets-Sheet 1
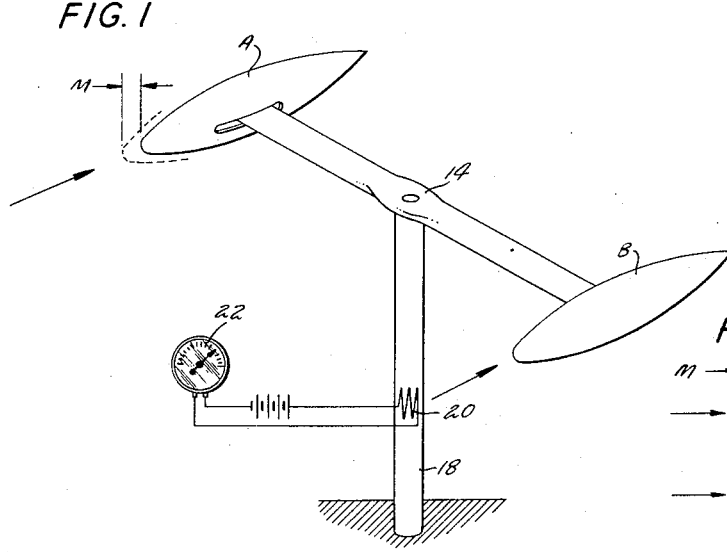
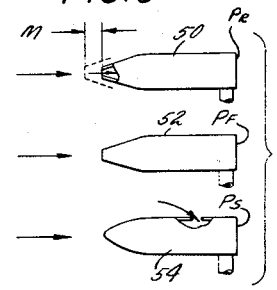
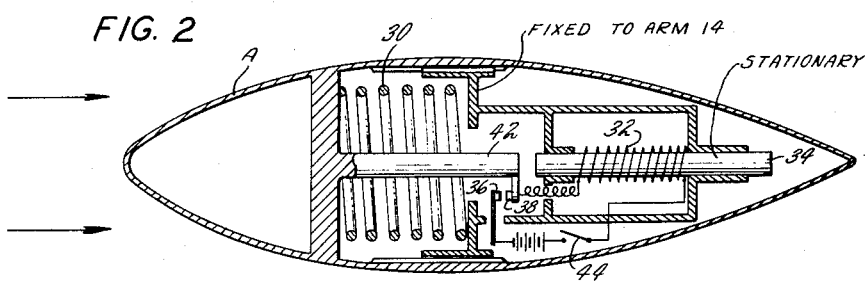
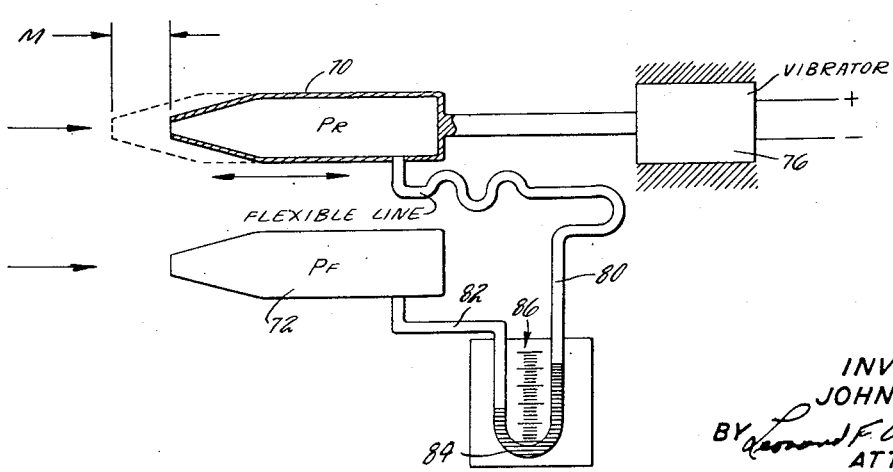
INVENTOR
JOHN G. LEE
BY Leonard F. Weklind
ATTORNEY Jan. 29, 1957  J. G. LEE  2,779,193
FLUID FLOW MEASURING DEVICE
Filed April 5, 1954  2 Sheets-Sheet 2
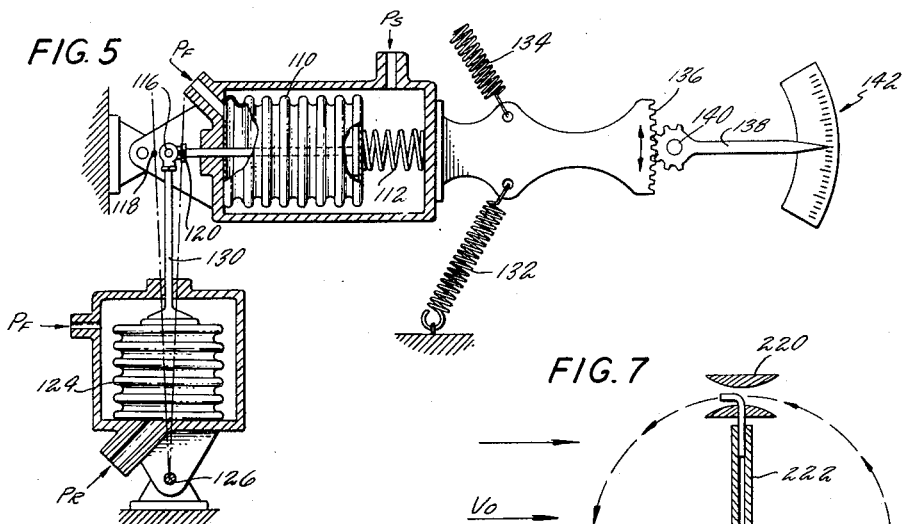
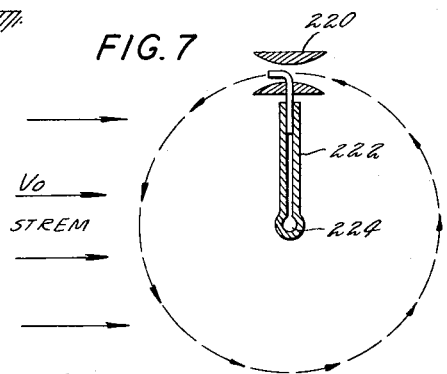
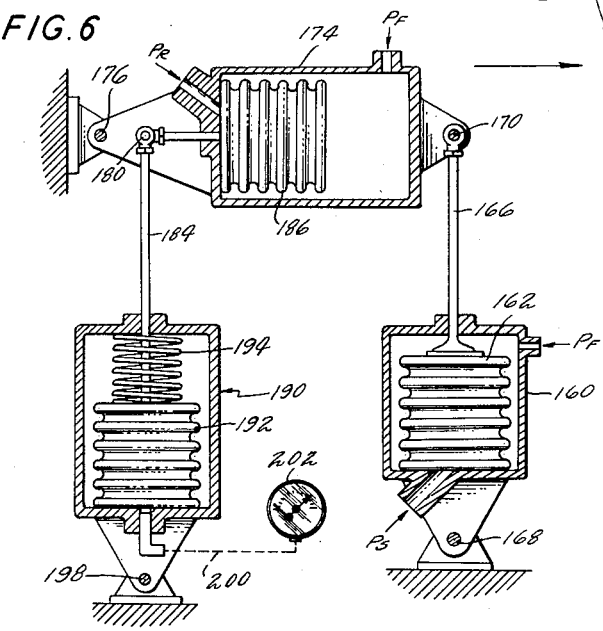
INVENTOR
JOHN G. LEE
BY
ATTORNEY

United States Patent Office 2,779,193
Patented Jan. 29, 1957

2,779,193

FLUID FLOW MEASURING DEVICE

John G. Lee, Farmington, Conn., assignor to United Aircraft Corporation, East Hartford, Conn., a corporation of Delaware Application April 5, 1954, Serial No. 420,861

12 Claims. (Cl. 73—194)

This invention relates to the measurement of density, $\rho$, or other fluid stream characteristics.

The objects of this invention will become apparent from the following description and particularly in connection with the explanation of the drawings in which:

Figs. 1 and 2 are partial schematic and partial cross-sectional views of a modification of the invention providing for the measurement of density directly.

Figs. 3 and 4 show a modified form of density measuring means.

Fig. 5 is a cross-sectional view of a modification of the invention providing for the measurement of mass flow directly.

Fig. 6 is a cross-sectional view of a modification of this invention providing for the measurement of velocity directly; and Fig. 7 is a partial schematic and cross-sectional view of a modified form of the invention providing a variable velocity device applicable to the devices shown in the other figures.

The invention is primarily based on the fact that there is a difference in behavior of or effect on two objects which are exposed to a fluid stream where one of the objects is stationary and the other object has an effective reciprocating motion relative to the stream. Thus if the stream has a velocity, V, and the reciprocating object has a variable velocity, $v$, then the stationary object will be exposed to dynamic effects in the fluid stream which are proportional to $V^2$. On the other hand, the reciprocating object will be exposed to dynamic effects which, on a time average, are proportional to $$\frac{1}{t}\int (V+v)^2 dt$$

It can be shown that where the motion $v$ is defined or determined, and is generally sinusoidal, the difference, $$\frac{1}{t}\int (V+v)^2 dt - V^2$$

is equal to a constant irrespective of V. As a result, several different flow measuring devices can be used for measuring certain characteristics of the stream.

For example, as seen in Fig. 1, two identical objects A and B are shown carried by arm 14 at equal distances from the vertical support or torque shaft 18 which is fixed to the arm 14. The streamlined body or object A is movable with respect to arm 14 and, by means to be described hereinafter, is reciprocated at a predetermined frequency so that it has a motion of magnitude M and a velocity $v$ in a stream of velocity V. On the other hand, the body or object B is fixed relative to the arm 14. It can then be shown that the difference in drag of the two bodies is equal to a constant, which fact can be utilized to advantage. By way of example it is well known that, drag of object $B = D_B = C_D \tfrac{1}{2} \rho V^2$ time average drag of object $A =$ $$D_A = \frac{1}{t} C_D \tfrac{1}{2} \rho \int (V+v)^2 dt$$

where
$C_D$ = drag coefficient
$\rho$ = stream density
then $$V^2 = \frac{D_B}{C_D \tfrac{1}{2}\rho} \text{ and } \frac{1}{t}\int (V+v)^2 dt = \frac{D_A}{C_D \tfrac{1}{2}\rho}$$

therefore $$\frac{D_A - D_B}{C_D \tfrac{1}{2}\rho} = \frac{1}{t}\int (V+v)^2 dt - V^2 = \text{constant} = K_1$$

simplifying $$D_A - D_B = K_1 C_D \tfrac{1}{2}\rho = K_2 \rho$$

The difference in drag $D_A - D_B$ multiplied by the radius from the shaft center is equal to the torque on shaft 18. This torque can readily be measured by any suitable means as for example by a strain gauge 20 and a suitable indicator 22 which could be calibrated and scaled to read density directly.

The vibrating mechanism for the object A may be any suitable electromagnetic, mechanical or piezoelectric means. A simple vibrator of the type shown in Fig. 2 may be used. Thus the object A would be moved in a forward direction by a spring 30 and moved rearwardly by means of a coil 32 wound around core 34 fixed to the stationary arm 14 of Fig. 1. The contacts 36, 38 engage upon motion in a forward direction and energization of coil 32 causes the permanent magnet 42 and the body A to move aft. As soon as aft movement commences the contacts 36, 38 are parted thereby de-energizing coil 32 thus permitting the spring 30 to move body A forward again. Oscillation or vibration continues as long as switch 44 is closed.

Another form of measuring device based primarily on principles similar to that above can be described as follows. Referring to Fig. 3, three tubes are shown as being exposed to a fluid stream having a constant velocity, V. The tube 50 will sense a time average total pressure $P_R$ and has a reciprocating motion of magnitude, M and velocity, $v$. The tube can be reciprocated by any suitable means as for example by the device shown in Fig. 2. The tube 52 is fixed and measures total pressure, $P_F$ while the tube 54 is also fixed and measures stream static pressure, $P_S$. It is known that $P_S$ = static pressure $$P_R = \tfrac{1}{2}\rho \frac{1}{t}\int (V+v)^2 dt + P_S$$

$$P_F = \tfrac{1}{2}\rho V^2 + P_S$$

Then $$\frac{P_R - P_S}{\tfrac{1}{2}\rho} = \frac{1}{t}\int (V+v)^2 dt$$

and $$\frac{P_F - P_S}{\tfrac{1}{2}\rho} = V^2$$

so $$\frac{(P_R - P_S) - (P_F - P_S)}{\tfrac{1}{2}\rho} = \frac{P_R - P_F}{\tfrac{1}{2}\rho} =$$

$$\frac{1}{t}\int (V+v)^2 dt - V^2 = \text{constant}$$

simplifying
$P_R - P_F = K\rho$ which is a measurement of density irrespective of velocity, pressure, or temperature of the fluid stream.

If $P_R - P_F = K\rho$, and it is well known that $$P_F - P_S = \tfrac{1}{2}\rho V^2$$

then by dividing we have $$\frac{P_F - P_S}{P_R - P_F} = \frac{\tfrac{1}{2}\rho V^2}{K\rho}$$

from which $$V^2 = K_1\left(\frac{P_F - P_S}{P_R - P_F}\right)$$

or $$V = K_2\sqrt{\frac{P_F - P_S}{P_R - P_F}}$$

The above then is an indication of velocity of the stream irrespective of temperature, pressure or density.

Also, at the position of the two bodies $$\text{Mass flow per unit area} = \rho V = \frac{\tfrac{1}{2}\rho V^2}{\tfrac{1}{2}V}$$

substituting $$\rho V = \frac{P_F - P_S}{\tfrac{1}{2}K_2\sqrt{\frac{P_F - P_S}{P_R - P_F}}}$$

simplifying $$\rho V = K_3 \sqrt{(P_F - P_S)(P_R - P_F)}$$

This gives a measurement of mass flow per unit area irrespective of temperature, pressure, velocity, or density. The frequency, amplitude, velocity and form of motion of the reciprocating tube must be known however.

Thus by combining the pressures of the tubes 50, 52 and 54 in different ways we can obtain an indication of several stream characteristics.

Thus

Density $= \rho = C_1(P_R - P_F)$

Mass flow per unit area $= \rho V = C_2\sqrt{(P_F - P_S)(P_R - P_F)}$ and $$\text{Velocity} = V = C_3\sqrt{\frac{P_F - P_S}{P_R - P_F}}$$

$C_1$, $C_2$ and $C_3$ being constants in each instance.

The particular mechanisms which utilize the above quantities to indicate the respective stream characteristic are shown in Figs. 4, 5 and 6.

Referring to Fig. 4, two pressure sensing tubes 70 and 72 are shown. The tube 70 is reciprocated in the fluid stream by any suitable means such as a vibrator 76 schematically illustrated. The vibrator may be of the type shown in Fig. 2. The pressures from the tubes 70, 72 are led by lines 80 and 82 respectively to a U-tube 84 filled with a suitable liquid and including graduations 86. The graduations can be such as to include correction for the constant C, so as to read $\rho$ directly in the proper units. The difference in levels in the U-tube is readable directly on the graduations 80 as to indicate density ($\rho$).

The mechanism for indicating mass flow per unit area or $\rho V$ is illustrated in Fig. 5. Thus having the pressures (Fig. 3) $P_F$, $P_S$ and $P_R$ it is desired to determine the value $\rho V$, when $$\rho V = C_2 \sqrt{(P_F - P_S)(P_R - P_F)} = \text{Mass flow per unit area}$$

or $$(\rho V)^2 = C_2{}^2 (P_F - P_S)(P_R - P_F)$$

The combination of Sylphon 110 and spring 112 serve to measure the value $(P_F - P_S)$ since $P_F$ is conducted internally of and $P_S$ is conducted externally of the Sylphon bellows 110. As a result the movement of point or pivot 116 is proportional to $(P_F - P_S)$ and this movement is relatively small being defined in range between points 118 and 120. Sylphon 124, which is mounted in a container pivoted at 126, measures the value $(P_R - P_F)$ and the force in rod 130 is proportional to that value. The distance 116—126 is long relative to distance between points 118—120 so that the line of action of 116—126 remains substantially parallel. Since the force in rod 130 is proportional to $(P_R - P_F)$ and the arm 118—116 (in the position shown in Fig. 5) is proportional to $(P_F - P_S)$ the moment around point 118 is proportional to the product of those pressure differences or to $$\frac{(\rho V)^2}{C^2}$$

Springs 132, 134 provide the constants and the indication is made through gearing 136 which rotates the hand 138 about its pivot 140 to indicate on scale 142. Scale 142 is calibrated to read $\rho V$ directly.

Fig. 6 illustrates the mechanism for indicating velocity, V, directly. Thus having the pressures $P_F$, $P_S$ and $P_R$ (Fig. 3) it is desired to determine the value V, when $$V = C_3 \sqrt{\frac{(P_F - P_S)}{(P_R - P_F)}} = \text{Velocity}$$

or $$\frac{V^2}{(C_3)^2} = \frac{(P_F - P_S)}{(P_R - P_F)}$$

Unit 160 (Fig. 6) contains a Sylphon 162 and measures the pressure difference $(P_F - P_S)$ so that the force in rod 166 is proportional thereto. Unit 160 is anchored on pivot 168 and rod 166 is pivoted at 170 to unit 174 which in turn is anchored on pivot 176. Hence the moment about pivot 176 is proportional to $(P_F - P_S)$. This moment is also proportional to the distance between pivot 176 and pivot 180 multiplied by the force in rod 184. With unit 174 containing a Sylphon 186 (exposed internally and externally to pressures $P_R$ and $P_F$ respectively) the distance 176—180 is proportional to $(P_R - P_F)$. Then the force in rod 184 is proportional to $$\frac{(P_F - P_S)}{(P_R - P_F)}$$

or to $$\frac{V^2}{(C_3)^2}$$

Rod 184 is slidable through the outer casing of unit 190 which contains a Sylphon 192 fixed to the bottom thereof. The free end of Sylphon 192 is attached to the lower end of rod 184. A calibrated spring 194 engages the free end of Sylphon 192 and the upper part of the casing of unit 190. The casing of unit 190 is anchored on pivot 198 so that the pressure in the Sylphon 192 is proportional to $V^2$. The pressure in Sylphon 192 is piped via a suitable flexible line 200 to a Bourdon gauge 202 or other suitable device having a scale calibrated to read velocity, V, directly.

The principle of determining $\rho$ by superimposing a known variable velocity onto a constant velocity can be applied to any device where the two velocities are independently variable. Thus the device shown in Fig. 7 comprises a Kiel tube 220 rotatable on an arm 222 around a center 224 with a constant tip linear velocity $v_0$ in a stream having a velocity $V_0$. Obviously $v_0$ must be greater than V. In this case the superimposed velocity $v_0$ is constant and the stream velocity $V_0$ is constant, but since the relative direction varies sinusoidally we have the condition of $$\frac{1}{t}\int(v_o + V_o)^2 dt - V_o{}^2 = K \text{ (constant)}$$

and the velocity $v_0$ being sinusoidal, K is equal to $.50V_0{}^2$. Thus if the pressure averaged in a plenum chamber at 224 is compared to the total and static pressures measured with stationary tubes (such as in Fig. 3) $\rho$, V and $\rho V$ may be determined in a manner similar to the reciprocating tube previously described above.

From the foregoing description it is readily apparent that as a result of this invention a simple yet reliable and accurate means has been provided for measuring any one of a number of fluid stream characteristics.

Although certain embodiments of this invention have been illustrated and described herein it will be apparent that various changes may be made in the arrangement What it is desired to obtain by Letters Patent is:

1. In a fluid flow measuring device, at least two probes positioned in a fluid stream whose characteristics are to be measured, means for reciprocating one of said probes at a predetermined amplitude along the axis of fluid flow, and differential measuring means for comparing the forces acting on said probes.

2. In a fluid flow measuring device having at least two probes exposed to a fluid stream, each of said probes including at least two impact pressure tubes, means for continuously reciprocating one of said tubes along the axis of fluid flow at a predetermined amplitude, and means for comparing the pressures in said tubes to measure the characteristics of flow of the stream.

3. In a fluid flow measuring device, at least two probes exposed to the stream to be measured, means for moving one of said probes along the axis of and relative to the stream and at a predetermined amplitude, the other of said probes being fixed relative to the stream, and means operatively connected to said probes for comparing the forces acting on said probes to determine a characteristic of the stream.

4. In a fluid flow measuring device, at least two probes exposed to the stream a characteristic of which is to be measured, said probes sensing total pressure of the stream, means for continuously moving one of said probes in a sinusoidal manner along the axis of flow of the stream, the other of said probes being stationary relative to the stream, and means operatively connected to said probes for comparing the resultant forces acting on said probes.

5. In a fluid flow measuring device, at least two probes exposed to the stream, means for moving one of said probes along the axis of and relative to said stream at symmetrically varying relative velocities, the other of said probes being fixed relative to the stream, and means for comparing the relative forces acting on said probes to determine the characteristic of the stream to be measured.

6. In a fluid flow measuring device, a torsion member fixed against movement, a transverse member fixed intermediate its ends to said torsion member, two probes positioned in a fluid stream whose characteristics are to be measured and fixedly attached to the ends of said transverse member, means for reciprocating at least a portion of one of said probes whereby the drag of one probe differs from the drag of the other thereby producing a torque on said torsion member, and means for measuring the torque so produced.

7. In a fluid flow measuring device having at least one hollow probe positioned in the stream and having an opening exposed to the stream, said opening communicating internally of the probe, means for moving said probe along the axis of flow of the stream at systematically varying velocities, means producing a signal commensurate with the pressure in said probe, means for producing a signal commensurate with the total pressure of the stream, and means for combining said signals to determine the value of the characteristic of the stream which is to be measured.

8. In a fluid flow measuring device having at least one hollow probe positioned in the stream and having an opening directed into the stream, said opening communicating internally of the probe, means for continuously moving said probe along the axis of flow of the stream at systematically varying velocities, means producing a signal commensurate with the average pressure in said probe, means for producing a signal commensurate with the total pressure of the stream, means for producing a signal commensurate with the static pressure of the stream, and means for combining said signals to determine the value of the characteristic of the stream which is to be measured.

9. In a fluid flow measuring device having at least one hollow probe positioned in a stream a characteristic of which is to be measured, said probe having an opening exposed to the stream, means for continuously moving said probe along the axis of flow of the stream at systematically varying velocities, means for sensing the pressure in said probe, probe means for measuring at least the total pressure of the stream, and means for comparing said pressures to determine the characteristic of the stream.

10. In a fluid flow measuring device having at least one hollow probe positioned in the stream and having an opening exposed to the stream, said opening communicating internally of the probe, means for moving said probe along the axis of flow of the stream in systematically varying velocities, means producing a signal commensurate with the average pressure in said probe, means for producing a signal commensurate with the total pressure of the stream, and means for combining said signals to determine the value of the characteristic of the stream which is to be measured, said last mentioned means including mechanism for determining the difference of said signals.

11. In a fluid flow measuring device having at least one hollow probe positioned in the stream and having an opening exposed and directed into the stream, said opening communicating internally of the probe, means for moving said probe along the axis of flow of the stream in systematically varying velocities, means producing a signal commensurate with the average pressure in said probe, means for producing a signal commensurate with the total pressure of the stream, means for producing a signal commensurate with the static pressure of the stream, and means for combining said signals to determine the value of the characteristic of the stream which is to be measured, said last mentioned means including mechanism for obtaining the product of the difference of several of said signals.

12. In a fluid flow measuring device having at least one hollow probe positioned in the stream and having an opening exposed to the stream, said opening communicating internally of the probe, means for moving said probe along the axis of flow of the stream in systematically varying velocities, means producing a signal commensurate with the average pressure in said probe, means for producing a signal commensurate with the total pressure of the stream, means for producing a signal commensurate with the static pressure of the stream, and means for combining said signals to determine the value of the characteristic of the stream which is to be measured, said last mentioned means including mechanism for obtaining the ratio of the difference of several of said signals.

References Cited in the file of this patent

UNITED STATES PATENTS

| | | |
|---|---|---|
| 2,512,790 | Cleveland | June 27, 1950 |
| 2,632,327 | Smith | Mar. 24, 1953 |